United States Patent [19]

Habdas

[11] Patent Number: 5,741,039
[45] Date of Patent: Apr. 21, 1998

[54] CARGO BOX EXTENDING TAILGATE UTILIZING A TWO PANEL/INTERMESHING DESIGN

[76] Inventor: Edward P. Habdas, 2302 Cochran Rd., Panama City, Fla. 32408

[21] Appl. No.: 813,308

[22] Filed: Mar. 10, 1997

[51] Int. Cl.⁶ .................................................. B62D 25/00
[52] U.S. Cl. ............................................ 296/57.1; 296/26
[58] Field of Search ................................... 296/26, 27, 50, 296/51, 52, 53, 55, 56, 57.1, 59

[56] References Cited

U.S. PATENT DOCUMENTS

| | | | |
|---|---|---|---|
| 4,023,850 | 5/1977 | Tillery | 296/26 |
| 4,114,944 | 9/1978 | Joynt et al. | 296/50 |
| 5,154,470 | 10/1992 | Bringman, Jr. | 296/26 |

Primary Examiner—Jesus D. Sotelo

[57] ABSTRACT

A unique and novel tailgate construction consisting of an inner panel and an outer panel hinged in such a way as to extend the axially secured length of the cargo bed of a pickup truck by approximately 18 inches when the outer panel is secured in a horizontal position and the inner panel secured in a vertical position wherein the strength, economics and styling of the design are accomplished by means of a unique sheet metal construction wherein the inner surfaces of both panels have an undulating configuration that mate into an intermeshing relationship when the panels are abutting thereby producing a high bending strength to composite thickness ratio which in turn is highly adaptable to the vehicle's styling.

3 Claims, 3 Drawing Sheets

CARGO BOX EXTENDING TAILGATE UTILIZING A TWO PANEL/INTERMESHING DESIGN

BACKGROUND OF THE INVENTION

1. Field of the Invention

The present invention relates generally to a tailgate for extending the useful length of a vehicle cargo bed and more particularly to an inventive system that utilizes two panels in a unique and novel intermeshing and rotational arrangement.

2. Background Art

The original market for the pickup truck was, for the most part, comprised of farmers, contractors and business people in general who had equipment and small loads of material to transport. The passenger compartment was of secondary importance to the cargo carrying capacity.

Recently, due to many factors, the demand for pickup trucks has risen sharply and sales approach those for passenger cars. Some of these factors are; the size reduction of the passenger car with its reduced load capacity; the significant reduction in towing capability due to body construction and smaller engine size; the movement to the suburbs which necessitated chores for which a pickup truck is ideal, that is hauling shrubs, dirt, fertilizers, timbers, etc.; the rise in popularity of do-it-yourself projects which require the transportation of limited amounts of construction materials; the evolution of outdoor sports which required the hauling of snowmobiles, dirt bikes, sailboards, jetskis, etc., many of these in the cargo bed of the pickup truck. In addition the hauling of passengers also became more necessary as trips to little league, school, shopping, etc. were a new requirement of suburbia.

As the non-commercial use of the pickup truck increased, the design emphasis shifted from the cargo carrying capability to passenger capacity and comfort. Designers progressed from roomier front seat cabs to extended cabs with a small rear seat to fully extended cabs offering a large back seat. This evolution has led to the situation where the pickup truck has progressed from the "second family" car to the only family car, thus making passengers as important as cargo.

This trend of the pickup truck to become a family car also caused the physical appearance of the vehicle to become a major factor in consumer selection in the market place. For this reason styling design has taken on a major importance in the industry. The styling of the pickup truck now compares very favorably with that of the passenger car. This factor dictates that any added options, such as a cargo bed extending tailgate, do not in any way detract from the efforts exerted by the industry's styling designers.

The commercial use of the pickup truck has also undergone changes. The widespread use of cellular phones and portable computors has allowed many business people to use their trucks as mobile offices. This use increases the requirement for more cab space. At the same time many businesses regard their trucks as moving advertisements for their business and demand the best styling available. While these new customer requirements are emerging, the original, basic purpose of the vehicle remains, that is, to transport some form of cargo.

It is apparent from the foregoing discussion that the wide variety of demands on the dual purpose pickup truck presents a dilemma for the designer. In some cases, the passenger considerations outweigh the cargo carrying capability, while in other cases, the cargo capacity is more important, and finally, in many cases both aspects are equally important. One method used in an attempt to obviate this dilemma is to offer the consumer an extremely wide range of cargo box verses cab size versions. In one case of the standard sized pickup truck seven different combinations of cab and cargo box are offered. These require five different wheelbases and overall lengths. Even with these increased production and inventory costs the purchaser is still forced to sacrifice some need when selecting a particular model.

A most critical choice is made when, in order to gain a roomier cab, a typical short bed is chosen in lieu of a longer cargo bed and the ability to transport the most standard construction length, eight feet, with tailgate security is sacrificed. Although these long loads may be transported with the standard tailgate down or removed this necessitates securing the load in some manner.

SUMMARY OF THE INVENTION

It is among the objects of this invention to provide a unique and novel tailgate construction for a pickup truck which adds approximately 18 inches of length to the cargo bed while providing standard tailgate security from axial movement. This increase provides approximately 20 percent increase in both length and volume capacity of a typical cargo bed and in many cases allows the transporting of 8 foot lengths of lumber, plywood, sheetrock,etc. with tailgate security where this capability did not exist with the standard tailgate.

It is a further object of this invention to provide a unique and novel tailgate construction for a pickup truck that does not destroy nor compromise the styling design of the manufacturer.

It is a further object of this invention to provide a unique and novel tailgate construction for a pickup truck that is directly interchangeable with the standard tailgate and does not require any modification to the original cargo bed for substitution.

It is a further object of this invention to provide a unique and novel tailgate construction for a pickup truck whose construction utilizes standard sheet metal fabrication technology and is adaptable to mass production.

It is a further object of this invention to provide a unique and novel tailgate construction for a pickup truck which is made up of two panels, an outer panel with one edge in rotational attachment to the cargo bed in the same manner as the standard tailgate and an inner panel in rotational attachment to the opposite edge of the outer panel wherein the inner panel is capable of a minimum of 270 degrees of rotation with respect to the abutting position of the two panels.

It is a further object of this invention to provide a unique and novel tailgate construction for a pickup truck which is made up of two panels, an outer panel with one edge in rotational attachment to the cargo bed in the same manner as the standard tailgate and an inner panel in rotational attachment to the opposite edge of the outer panel wherein the outer panel maintains the same mechanical strength to lateral bending as the original design specifications for the standard tailgate and the inner panel has sufficient strength to provide security for axial shifting of the cargo.

It is a further object of this invention to provide a unique and novel tailgate construction for a pickup truck which is made up of two panels, an outer panel with one edge in rotational attachment to the cargo bed in the same manner as the standard tailgate and an inner panel in rotational attachment to the opposite edge of the outer panel such that when the outer panel is in the horizontal position in line with the cargo bed floor of the pickup truck and the inner panel is rotated to a vertical position, or greater, the surface of the outer panel is substantially level with the cargo bed floor.

It is a further object of this invention to provide a unique and novel tailgate construction for a pickup truck which is made up of two panels, an outer panel with one edge in rotational attachment to the cargo bed in the same manner as the standard tailgate and an inner panel in rotational attachment to the opposite edge of the outer panel such that when the inner and outer panels are abutting and in a horizontal position, the upper surface of the inner panel is substantially level with the cargo bed floor, preferably within a fraction of an inch of alignment.

It is believed that the achievement of all of the above stated objectives is essential for the cargo bed extending tailgate to be a commercially viable product and gain widespread consumer acceptance as an integral part of the pickup truck.

No prior art shows any device that accomplishes more than a few of the above objectives, possibly accounting for the lack of significant usage for this very useful option.

The novel design of this invention allows all the objectives to be met by utilizing two panels that are arranged in an all important intermeshing relationship. This intermeshing relationship allows the panels to be made of sheet metal, have high lateral bending strength and yet maintain a thin profile which is important to styling considerations and allows the step in bed to tailgate surfaces to be minimized. As an example, if the required lateral bending strength of a sheet metal outer panel requires a thickness of 3 inches and the same strength is required of the sheet metal inner panel making it also 3 inches, the composite cargo bed extending tailgate would then be 6 inches when the panels are abutting. Such a cumbersome package would detract from styling and cause a significant step in the bed floor to tailgate surface levels.

This invention produces the required lateral bending strength by using a relatively thin outer panel that has one or more outward projections stamped into the inner sheet metal surface that extend the lateral length of the panel and intermesh with corresponding depressions stamped into the inner sheet metal surface of the inner panel. In the same manner the inner panel has one or more outward projections stamped into its inner sheet metal surface that extend the lateral length of the panel and intermesh with corresponding depressions stamped into the inner sheet metal surface of the outer panel. Therefore while great lateral bending strength can be obtained for both panels by means of the sheet metal projections, the intermeshing resulting when the panels are abutting produces a composite thickness only slightly greater than for a single panel.

Other objectives and features of the invention will become apparent as the desciption proceeds, especially when taken in conjunction with the accompanying drawings.

DETAILED DESCRIPTION OF THE PREFERRED EMBODIMENTS

Figure 1:
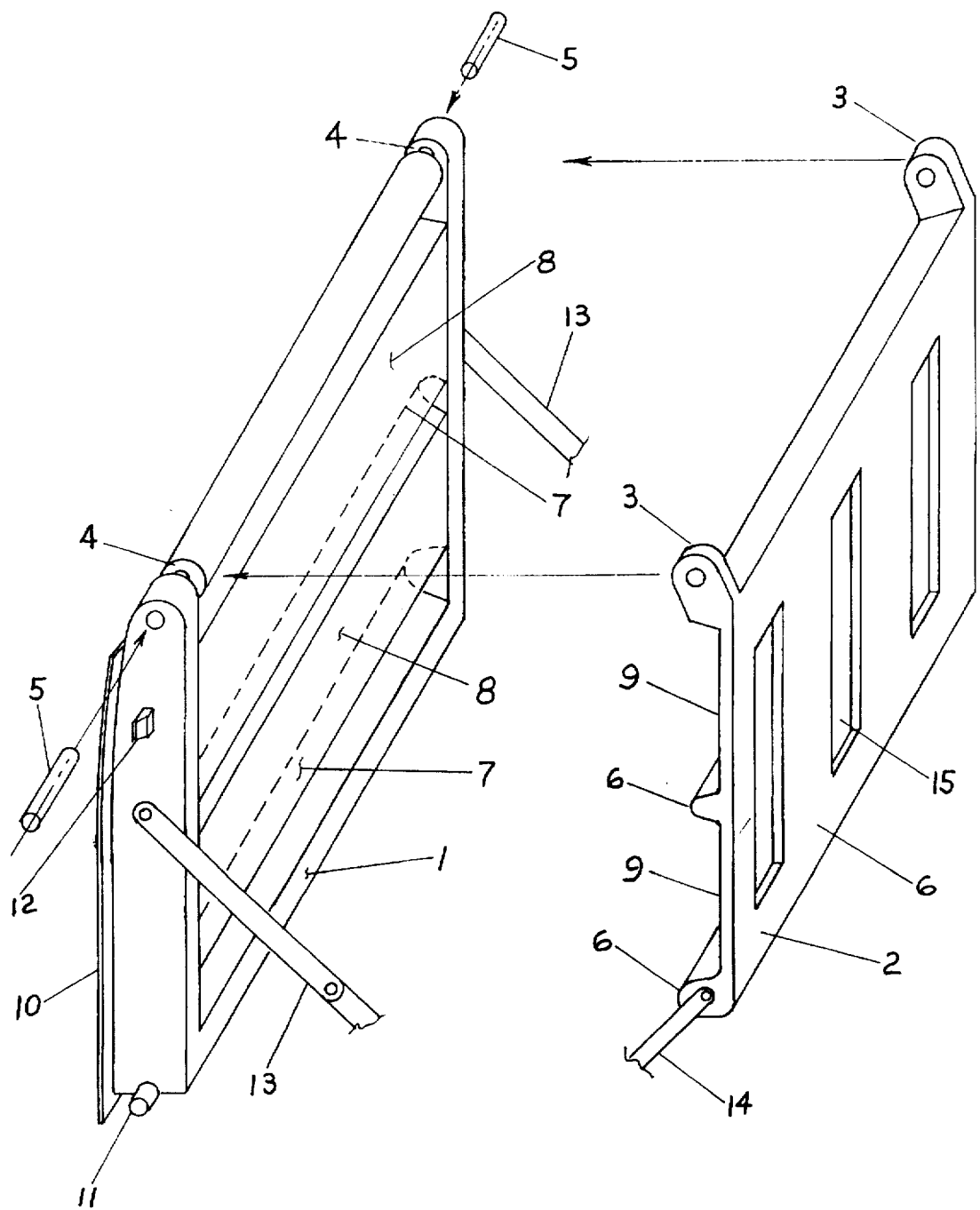
FIG. 1 shows the bed extending tailgate with the inner panel and the outer panel separated for clarity. The pivots and pivot pins that allow for 270 degrees of rotation are also shown.

Referring now to the drawings wherein like reference numerals are used to identify identical components in the various views, FIG. 1 shows the outer panel 1 and the inner panel 2 before joining to form the composite cargo bed extending tailgate of this invention. The pivot blocks 3 of the inner panel 2 fit into the notched pockets 4 provided in the outer panel 1 and are held in rotational engagement by means of pivot pins 5. The notched pockets 4 and the pivot blocks 3 are so dimensioned as to allow a minimum of 270 degrees of rotation of the inner panel with respect to the outer panel.

The convex portions of the strength producing projections, or convolutes, 6 of the inner panel 2 are positioned so as to recess into corresponding recesses, or concave convolutes, 77 of the outer panel 1. Likewise, the projecting portions 8 of the inner sheet metal surface of the outer panel 1 project into corresponding recessed sections 9 of the inner sheet metal surface of the inner panel 2. It is apparent that in place of the several curved sections shown, the intermeshing surfaces 6,7,8, and 9 could be a series of undulating curves of various shapes or vee-grooves.

It is this unique application of intermeshing surfaces that allows the two panels to be designed with adequate lateral bending strength in each panel and yet result in a composite mated thickness essentially equivalent to that of a single panel of the same strength. The outer surface 10 of the outer panel 1 can readily be made to duplicate the manufacturer's original styling with the inner convoluted surface 8 spot welded directly to it or to vertical spacers intermittently spaced between the two surfaces. The result of this construction technique is that the manufacturer's original styling design can be maintained while still providing the desireable option of a cargo bed extending tailgate.

The number of convolutes, their depth and the gage of sheet metal are parameters which may be varied, either individually or together, in order to achieve the required panel strength for the design duty of the pickup truck with a view to the total economics of the system. It is apparent that there is also a wide range of shapes that may be used for the convolutes.

Also shown in FIG. 1 is pivot 11 used to rotationally connect the outer panel 1 to the cargo box of the pickup truck in exactly the same manner as the manufacturer provided for connecting his standard tailgate. The latch pin 12 is of the same design and in the same location as for the standard tailgate and has its actuating mechanism threaded through one of the convex sections of the inner sheet metal surface 8. Bracket 13 is used to hold outer panel 1 in the horizontal position when it is lowered to extend the cargo bed. Again this bracket is a duplicate of that used on the standard tailgate and the cargo bed extending tailgate of this invention can be seen to directly replace a standard tailgate without any vehicular modifications.

Bracket 14 is pivotly attached to one edge of inner panel 2 so that it can be stored alongside of it in the closed position, or extended and connected to the outer panel 1 thereby locking the inner panel 2 in the vertical position when it is acting as the security tailgate for the extended cargo bed. When bracket 14 is disconnected from the outer panel the inner panel is free to rotate a full 270 degrees.

Depressions 15 may be stamped into the outer sheet metal surface 16 of the inner panel 2 for added strength in the vertical dimension and to provide a surface to which the inner sheet metal surface 9 can be welded.

Figure 2:
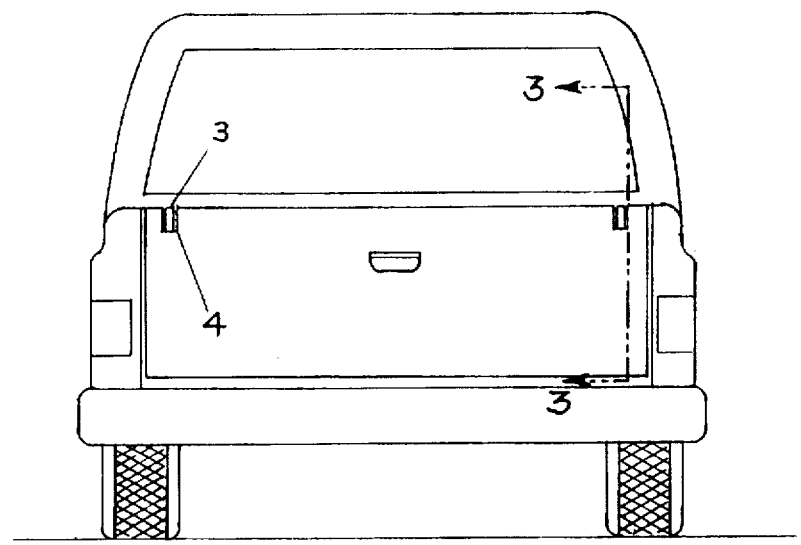
FIG. 2 is the rear view of a typical pickup truck equipped with the cargo bed extending tailgate showing the negligible effect on the vehicle styling.

FIG. 2 shows the only departure from the manufacturer's styling design as notches 4 in the upper edge of the outer panel 1. These are shown occupied by the pivot blocks 3 of inner panel 2. By chrome plating the pivot blocks 3 the vehicle's appearance can actually be enhanced.

Figure 3A:
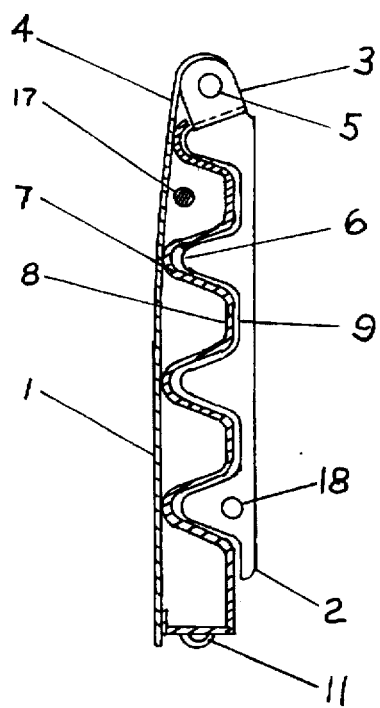
FIG. 3A is a cross section of one example of the intermeshing design for the inner and outer panels.

The section 3 of FIG. 2 is shown in FIG. 3A and shows the cross section of one possible design of the invention which provides maximum lateral bending strength for both the outer panel 1 and the inner panel 2. The convoluted portions of both panels are deep and large in number and yet do not appreciably increase the thickness of the composite cargo bed extending tailgate due to the unique intermeshing design of this invention. The convex portions 6 of the inner panel 2 recess into their corresponding concave portions 7 of the outer panel 1. At the same time the projecting surfaces 8 of the outer panel 1 recess into corresponding depressions 9 of the inner panel 2. Connecting mechanism 17 extends through a convex section of the outer panel 1 to actuate the tailgate latch 12. Pivot 18 is for the attachment of bracket 14 to the inner panel 2.

Figure 3B:
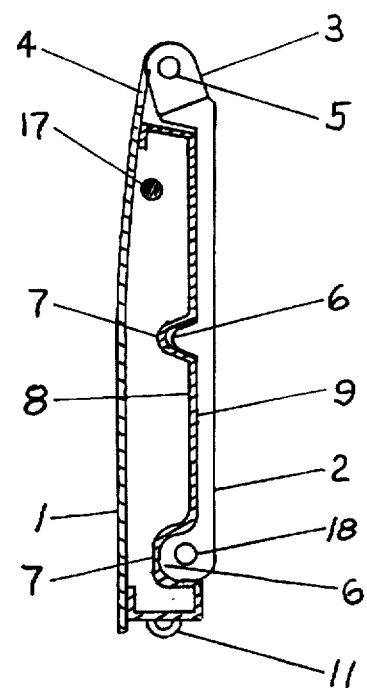
FIG. 3B is a cross section of a second example of the intermeshing design showing a preferred arrangement.

The section 3 of FIG. 2 is shown in FIG. 3B and shows the cross section of a preferred design of the invention wherein the lateral bending strength of the inner panel 2 is not a maximum but of sufficient strength to provide security for axial movement of the cargo. This situation is likely as the inner panel 2 will not be called upon to support the full impact of the cargo during loading as will the outer panel 1. The reason for this is that while the outer panel 1 may well be in the horizontal position extending the cargo bed during loading and therefore subjected to the full load the inner panel 2 can be rotated the full 270 degrees and not be subjected to any load. Therefore the strengthening projections 6 of the inner panel 2 can be reduced in number and degree of projection to provide only sufficient strength for resisting the axial shifting of the cargo. This foregoing discussion highlights the importance of the objective provided by this invention of designing a full 270 degrees of rotation into the two panel configuration. Also apparent is the degree of versatility the intermeshing design allows in proportioning relative bending strength between the two panels.

FIG. 3B shows a relatively large projection 6 along the edge opposite the pivot blocks 3 with a lesser projection 6 in the center of the inner panel 2. While the intermeshing design concept is not as obvious as in FIG. 3A it can be seen that the projections 6 of the inner panel 2 do recess into corresponding depressions 7 in the outer panel 1 while the raised sections 8 of the outer panel 2 recess into corresponding depressed surfaces 9 of the inner panel 2. Connecting mechanism 17 runs through the hollow space in the outer panel 1 to actuate the tailgate latch 12. Pivot 18 is for attachment of bracket 14 to the inner panel 2.

Figure 4:
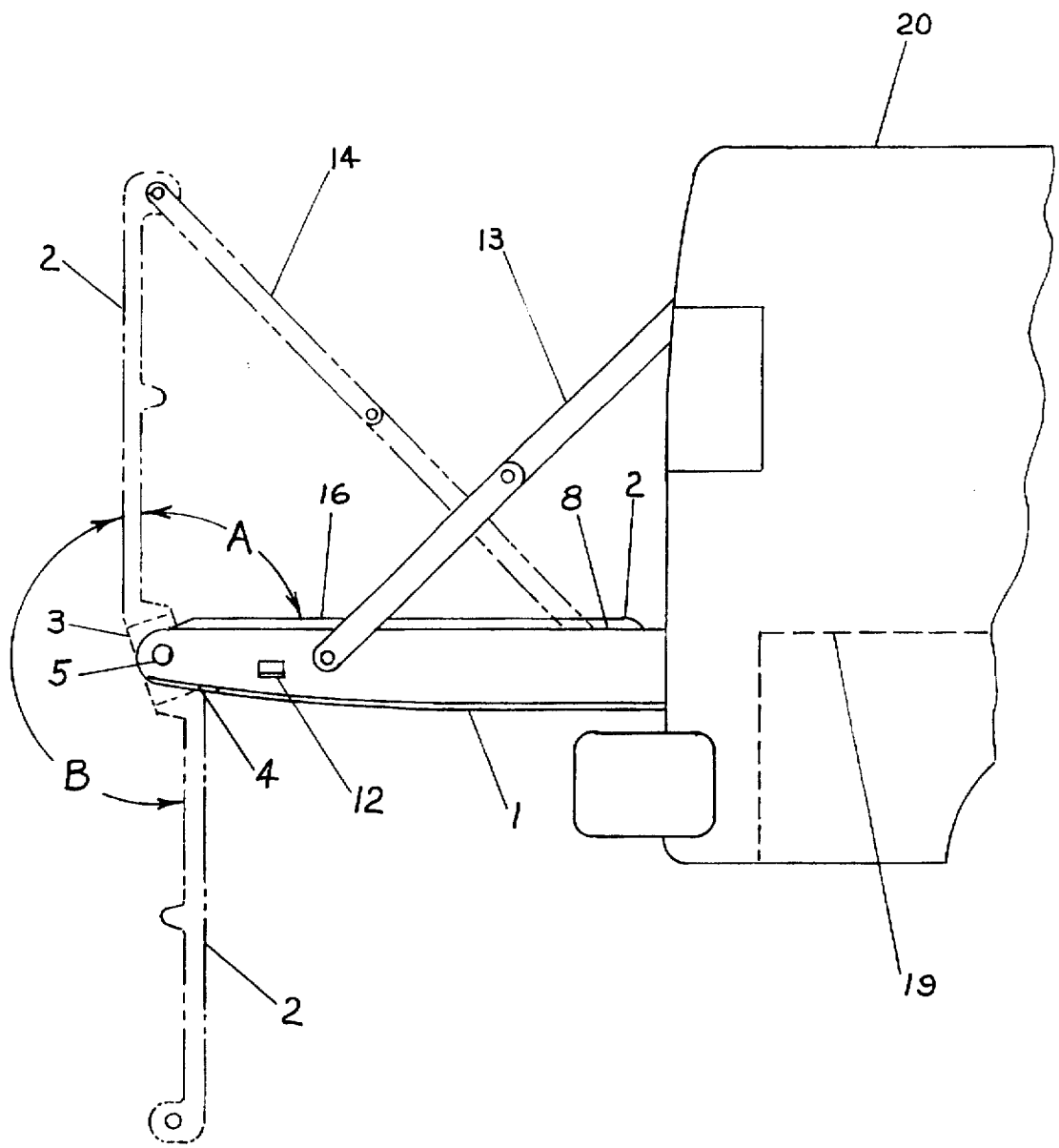
FIG. 4 shows a side view of a portion of the rear sideview of a pickup truck with the cargo bed extending tailgate in the horizontal position and the inner panel in its abutting, perpendicular and 270 degree positions.

FIG. 4 shows a portion of the rear view of a typical pickup truck with the cargo bed extending tailgate of this invention in the lowered, horizontal position and secured in place with bracket 13. Both the outer panel 1 and the inner panel 2 are shown in the horizontal position. It can be seen that the inner surface 8 of the outer panel 1 is in level alignment with the floor 19 of the cargo bed 20 of the pickup truck and that the outer surface 16 of the inner panel 2 is only slightly higher due to the intermeshing design. This eliminates any large steps in the cargo bed floor facilitating any loading operation that requires pushing or pulling of the cargo along the floor.

With inner panel 2 rotated 90 degrees to its vertical position as shown by rotation arrow A and secured in place by means of bracket 14 it now acts as a tailgate in a more rearward position thereby creating an extended length cargo bed. Loads are secured from axial movement and with the addition of netting or separate solid panels not shown full enclosure of the extended bed is obtained.

Further rotation as shown by rotation arrow B produces a full 270 degrees of rotation by inner panel 2 and allows the cargo bed to be loaded or unloaded with no interference from the inner panel 2.

From the Figures and preceeding discussion it is obvious that all of the objectives deemed essential for a commercially viable cargo bed extending tailgate that will have large consumer acceptance have been met by the unique two panel intermeshing design of this invention. The styling requirement is met by providing for the outer surface metal to have the same design as the manufacturer while keeping the composite thickness virtually the same as the standard tailgate. The versatility of the intermeshing convolutes allows design freedom for any strength requirement for each of the panels without any significant increase in composite thickness. This minimum change in thickness eliminates any significant change in the level of the bed floor whether the inner panel 2 is folded and in abutment with the horizontal outer panel 1 or whether it is rotated to some other position. The method used to pivotly attach the inner panel 2 to the outer panel 1 allows a full 270 degrees of rotation eliminating any interference with the loading of the cargo bed. Because the mounting and bracketing are the same as for the standard tailgate the cargo bed extending tailgate is directly interchangeable with it. Finally, the panels are constructed from welded, stamped sheet metal thereby conforming to existing manufacturing practices.

I claim:

1. A tailgate assembly for extending the useful surface of the cargo bed of a pickup truck while providing security from axial loss of the cargo, which assembly consists of two panels of sheet metal construction, an outer panel made up of an inner metal sheet and an outer metal sheet and in rotational attachment to the rear of the cargo box and an inner panel made up of an inner metal sheet and an outer metal sheet and in rotational attachment to the outer panel wherein the inner metal sheet of the outer panel has a configuration in which one or more raised sections extend laterally to provide mechanical strength and in which one or more recessed sections extend laterally to receive corresponding raised sections of the inner metal sheet of the inner panel and wherein the inner metal sheet of the inner panel has a configuration in which one or more raised sections extend laterally to provide mechanical strength and in which one or more recessed sections extend laterally to receive corresponding raised sections of the inner metal sheet of the outer panel and wherein the inner panel and outer panel mate into an intermeshing relationship when they are abutting.

2. An assembly of two rotationally connected panels of an intermeshing design as described in claim 1 wherein the inner panel has a minimum of 270 degrees of rotational freedom with respect to the outer panel.

3. An assembly of two rotationally connected panels of an intermeshing design as described in claim 1 wherein the outer sheet metal surface of the outer panel conforms to the vehicle's styling.

* * * * *